United States Patent [19]

Machen

[11] 4,249,877
[45] Feb. 10, 1981

[54] HIGH-SPEED DIRECT-DRIVE EXTRUDER

[76] Inventor: James F. Machen, 2495 Robinwood Ave., Toledo, Ohio 43620

[21] Appl. No.: 23,546

[22] Filed: Mar. 26, 1979

[51] Int. Cl.³ ............................................. B29F 3/02
[52] U.S. Cl. .................................... 425/204; 366/76; 366/79; 366/150; 366/156; 425/205; 425/207; 425/208; 425/209; 425/376 R; 425/379 R
[58] Field of Search ................ 425/200, 204, 205, 207, 425/208, 209, 376 R, 379; 366/76, 79, 150, 156; 264/68

[56] References Cited
U.S. PATENT DOCUMENTS 3,305,893  2/1967  Machen ........................... 425/376 R
3,817,675  6/1974  Maiocco ........................... 425/376 R
3,860,220  1/1975  Matsubayashi et al. .............. 264/68

Primary Examiner—Jeffery R. Thurlow

[57] ABSTRACT

An extruder for thermoplastics having a directly motor-driven high-speed feed screw which mechanically force-feeds raw plastic pellets, pushing them forward under high pressure into a heat-transfer zone for melting, and finally through a static mixer, to deliver a pressurized homogeneous melt to an extrusion die. Melt pressurization results entirely from the mechanical force-feeding action of the screw rather than through the viscous shear action found in conventional screw extruders.

10 Claims, 3 Drawing Figures

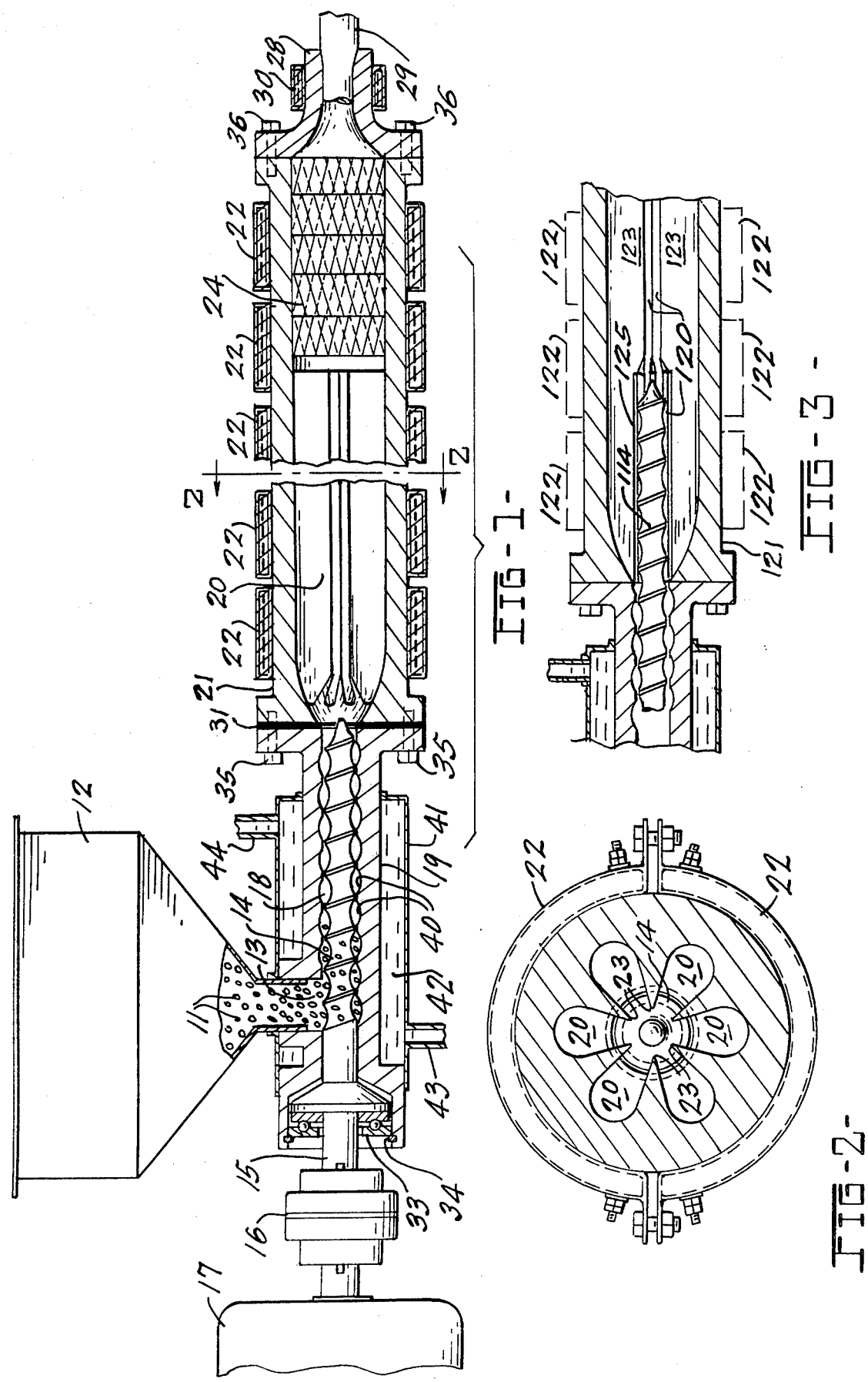

HIGH-SPEED DIRECT-DRIVE EXTRUDER

BACKGROUND OF THE INVENTION

This invention is related in various aspects to the *Extruder* of my U.S. Pat. No. 3,305,893 which disclosed a slow-speed screw in an unheated bore force-feeding plastic pellets forward under high pressure into and through a heat-transfer zone for melting and thence to an extrusion die. Melt pressure in that extruder resulted entirely from the mechanical force-feeding action of the screw, with no component of viscous shear build-up pressure. In the present invention, a primary distinguishing feature is the use of a directly motor-driven high-speed screw of relatively small diameter. Other distinguishing features should become apparent from the following detailed disclosure.

Conventional screw extruders in present wide usage employ motors, gear reducers, screws, and thrust bearings which are relatively large, costly in first and maintenance costs, and often lacking in efficiency. Also, in many cases excessive shear working in such extruders results in hot spots and molecular breakdown in the melt. Usually most of the melting heat enters as mechanical shaft power through the screw, and in many cases where intensive mixing is desired, excess shaft power must actually be dissipated as wasted heat energy by auxilliary cooling means. Furthermore, conventional extruders can be somewhat difficult to control because output is sensitive simultaeously to both melt temperature and back pressure. Also, screw changes must often be made to accomodate materials with different characteristics. Related to this is the need to employ complicated screw design theories based on non-Newtonian flow, melt counter-flow in the screw, residence time, and the like.

Objects of the Invention

Consequently, it is an object of this invention to provide an extruder which will not require gearing and thus will be lower in first cost, lower in maintenance costs, more compact and more efficient.

Another object of this invention is to provide an energy-saving extruder with a smaller drive motor, and wherein a substantial portion of the heat is added by conduction through the barrel side walls rather than by mechanical shaft power.

Another object is to provide an extruder which will accomodate alternate sources for melting heat energy as a substitute for electrical heat if desired.

Another object is to provide an extruder which employs the smallest diameter screw possible and consequently the smallest possible thrust bearing, again to reduce first and maintenance costs.

Another object is to provide an extruder that will accommodate a wide range of materials without a change in screw or other modifications or adaptions.

Another object is to provide an extruder whose output is relatively insensitive to melt temperature and whose melt pressure is more directly related to shaft torque.

Another object is to provide an extruder that will eliminate excessive shear working and hot spots in the melt, and which will have the shortest possible residence time.

Another object is to provide an extruder which will provide a thermally homogeneous melt with good pigment dispersion without heavy shear working.

Another object is to provide an extruder that will achieve these objects and yet remain simple in principle, design, construction, and operation.

BRIEF DESCRIPTION OF THE DRAWINGS

Other objects and advantages of this invention will become more apparent from the following description taken together with the drawings, in which:

FIG. 1 is a longitudinal sectional view of a preferred embodiment of this invention.

FIG. 2 is an enlarged sectional view of the preferred embodiment taken perpendicular to the longitudinal centerline of FIG. 1 showing the shape of the extruder cross-section in the heat-transfer zone.

FIG. 3 is a partial sectional view showing features of another possible embodiment of this extruder.

DESCRIPTION OF THE INVENTION

Referring to FIG. 1, raw thermoplastic 11 in pellet, flake, or granular form contained in supply hopper 12 enters extruder through inlet opening 13. Screw 14, substantially contained in bore 18, rotates at a relatively high speed driven by means of integral shaft 15 through coupling 16 from motor 17, to force plastic 11 forward through extruder body 19 and into melting chamber 20 of heated barrel 21.

Bearing 33, retained by ring 34, carries the reverse thrust forces developed as screw 14 forces plastic forward. Bolts 35 fasten barrel 21 to body 19, and bolts 36 fasten die head 28 to barrel 21.

Heat energy supplied from external electric band heaters 22 conducts through wall of barrel 21 and transfers to plastic in chamber 20 by means of heat-transfer fins 23 (see also FIG. 2). The plastic gradually melts as it is pushed forward through chamber 20, and is mostly or all melted as it enters static mixer 24 where it becomes thoroughly homogenized before exiting through die head 28 as extrudate 29. Auxiliary heater 30 maintains proper temperature at die head 28.

If desired, other sources of heat input may be substituted for electric band heaters 22 and 30 to supply heat externally to barrel 21 and die 28. One example of such other heating means would simply be a flame or hot gases from a burner impinging directly on barrel 21. Another possibility would be to employ a closed heating jacket surrounding barrel 21 and containing a hot heat-transfer liquid such as "Dowtherm"φ circulated from an external heat source.

It is essential with this invention to maintain screw 14 and body 19 at a temperature cool enough so that the plastic being acted upon remains substantially hard until it reaches melting chamber 20. A suitably cool temperature is here provided by means of cooling jacket 41 surrounding body 19. Coolant enters inlet 43, circulates through cooling chamber 42, and leaves through outlet 44. Heat tending to enter body 19 by conduction from heated barrel 21 is diminished by insulation 31.

In this regard, it has been found that the mass flow of raw plastic 11 entering inlet 13 at room temperature and carried forward by screw 14 can act as its own coolant for screw 14 and body 19. Under ordinary operation conditions with this embodiment the through-put of ambient raw plastic is sufficiently large and rapid that little or no melting takes place before it reaches the end of screw 14, even without external cooling. In this case the flow of coolant through chamber 42 is usually only necessary during extruder start-up and shut-down (when the screw is not turning).

So as to enhance the force-feeding ability of screw 14, suitable helical grooves 40 are provided in bore 18. These grooves 40 are of the opposite hand helix to that of screw 14 and cooperate in such a manner that the combination of elements becomes a sort of continuous ram. The solidly compacted plastic is forced forward into chamber 20 where it then gradually melts. Melt pressure results solely from this continuous forward push of substantially unplasticized material, hence it is independent of melt rheology. This is the reason that this extruder is relatively insensitive to rheological factors that may markedly affect the performance of conventional screw extruders.

Although in the preferred embodiment of this invention a certain portion of the heat energy input occurs as the result of screw friction, it is preferable that this portion remain substantially lesser than that entering by conduction through barrel walls 21. Hot spots are thus eliminated since the barrel wall temperature is controllable and because no heavy melt shearing is present.

In another embodiment of this invention, a degree of additional frictional heat input through shaft power may be obtained by employing a longer screw than is minimally necessary for adequate force feeding. Referring to FIG. 3, barrel 121 has relieved bore 125 cut part way along heat-transfer fins 123 to accomodate extended screw 114. Some circulatory action is induced between fins 123 in melting chamber 120 by the rotation of screw 114 in this embodiment to aid in melting and early mixing. Heaters 122 here provide heat input by conduction to barrel 121.

Screws 14 and 114 are shown with screw flights of the simplest design, that of a single lead, constant pitch, constant diameter, and constant depth. This was determined to function perfectly well in experimental testing. In other embodiments, it may be desireable to employ a screw having a multiple lead, variable pitch, changing diameter, and/or changing flight depth.

Motor 17 is preferably a variable or adjustable speed motor employing electrical, rather than mechanical, speed changing means. This is in keeping with the desirability of eliminating mechanical power transmission additions other than the straight motor-to-screw drive.

DISCUSSION OF DISTINGUISHING FEATURES

As previously pointed out, a primary distinguishing feature of this invention is the relatively high rotational speed of its screw. Conventional extruders presently operate at screw speeds typically under 200 RPM, with even the smallest diameter units seldom reaching 500 RPM. In contrast, the extruder of this invention can employ screw speeds of 1750 RPM or higher without difficulty.

In order to quantify a comparison of this extruder with conventional extruders, a study was made by the inventor to identify the design parameters relating *screw speed* and *screw diameter* for various extruders presently on the market. Based on this study the inventor has devised a "design factor" which provides a rule-of-thumb measurement for comparing various extruder designs, as follows:

$$F_D = N\sqrt{d}$$

where $F_D$ is the "design factor"
$N$ is the rated screw speed in RPM
$d$ is the screw diameter in inches In addition to being useful in analyzing extruder designs, this design factor will be used herein to establish a definite criterion to distinguish this invention from the prior art.

Various conventional extruders were found to have an $F_D$ ranging from 130 to 450, based on manufacturers' specifications. Interestingly, in the case of certain manufacturers $F_D$ tended to remain somewhat constant, indicating consistency of design. For example, one manufacturer had an $F_D$ ranging only from 196 to 206 for six sizes of its extruders. Another ranged from 237 to 318 for five sizes.

An experimental version of the preferred embodiment of this invention had a screw diameter of 0.75 inches with a rotational speed of 1750 RPM. Output was 101 lb./hr. of high density polyethylene at a pressure of 2000 lb./in.$^2$. Thus the $F_D$ for this version is 1515, a value significantly larger than those typical for conventional extruders, and one which can be seen as pointing out a distinguishing feature of this invention.

In addition to the $F_D$ factor, the low length-to-diameter (L/D) ratio of screw 14 of the preferred embodiment can also be seen as a distinguishing feature, taken in the context of other design factors. Conventional extruders have L/D ratios typically in the range of from 18:1 to 28:1. In contrast, the experimental version described above had an L/D ratio of only 8.7:1 (based on the effective screw length of 6.5 inches).

This invention employs one or more elements of a static mixer 24. In addition to providing molecular dispersion of the melted plastic, the static mixer also acts as a heat-transfer device, both for conducting heat inward from the walls of barrel 21 into melting chamber 20 through the mixer elements themselves, and also in evenly dispersing heat already transferred to the plastic in uneven fashion. Such mixing of the heat results in thermal homogenization, with a very low temperature gradient across the flow path. The use of a static mixer as a means of heat trasfer in an extruder should be seen as a further distinguishing feature of this invention.

Suitable static mixers which will provide heat conduction from the side walls as well as dispersion are those of the "cut and twist" type such as made by Kenics Corporation of North Andover, Mass. (covered by U.S. Pat. No. 3,286,992 issued to C. D. Armeniades), or that made by Koch Engineering Company of Wichita, Kansas (covered by U.S. Pat. No. 3,785,620 issued to Max Huber). Another possibility is the static mixer made by Charles Ross & Son Company of Hauppage, N.Y. (covered by U.S. Pat. No. 3,583,678 issued to R. E. Harder).

Those skilled in the art will recognize that a variety of embodiments of this invention other than those presented, employing the basic underlying or essentially similar principles, may be devised. It should therefore be understood that this invention is not to be limited to the specific constructions shown and described except as so provided in the following claims.

I claim:

1. A plastic extruder of the type described comprising:
    a cool bore;
    a raw material inlet for said bore;
    a non-plasticating feed screw in said cool bore;

said screw rotatable in said cool bore such that the maximum screw RPM times the square root of the screw diameter in inches equals at least 500;

the length to diameter ratio of said screw being less than 16 to 1;

said cool bore communicating with a heated-wall melting chamber;

means in said melting chamber for conducting heat from said heated walls into a variety of portions of the material flow stream through said melting chamber;

mixing means also in said melting chamber downstream from said heat conducting means;

and, an extrudate outlet for said melting chamber.

2. A plastic extruder according to claim 1 wherein said cool bore has grooved rifling of the opposite hand to that of the threads of said feed screw.

3. A plastic extruder according to claim 1 wherein said means for conducting heat from said heated walls into said material flow stream comprises a plurality of fins extending in an internal direction from said heated walls and into said material flow stream.

4. A plastic extruder according to claim 1 wherein said means for conducting heat from said heated walls into said material flow stream comprises a plurality of hollow passages in said heated walls each providing a separate flow path through at least a portion of said melting chamber.

5. A plastic extruder according to claim 1 wherein said mixing means comprises a series of fixed, curved vane elements.

6. A plastic extruder according to claim 1 wherein said mixing means incorporates a plurality of fixed, non-parallel flow channels.

7. A plastic extruder according to claim 1 wherein elements of said mixing means are also adapted to conduct heat into said material flow stream.

8. A plastic extruder according to claim 1 wherein auxiliary cooling means are provided for said cool bore.

9. A plastic extruder according to claim 1 wherein said feed screw extends for a substantial distance into said melting chamber.

10. A plastic extruder according to claim 1 wherein the maximum permissible RPM of said screw is at least 750.

* * * * *